March 9, 1926.

J. M. SPINKS

ATTACHMENT FOR WEIGHING SCALES

Filed Sept. 12, 1925

1,576,375

Inventor
Joseph M. Spinks.
By William C. Linton
Attorney

Patented Mar. 9, 1926.

1,576,375

UNITED STATES PATENT OFFICE.

JOSEPH M. SPINKS, OF NEW ORLEANS, LOUISIANA.

ATTACHMENT FOR WEIGHING SCALES.

Application filed September 12, 1925. Serial No. 55,966.

*To all whom it may concern:*

Be it known that I, JOSEPH M. SPINKS, a citizen of the United States of America, residing at New Orleans, in the parish of Orleans and State of Louisiana, have invented certain new and useful Improvements in Attachments for Weighing Scales; and I do hereby declare that the following is a full, clear, concise, and exact description of the invention, such as will enable others skilled in the art to which it appertains to make and use the same.

This invention relates to improvements in attachments for weighing scales of the balance beam type, having for an object to provide an attachment whereby to enable a user to quickly and readily secure an accurate zero balance and weighing balance of the scale beam, as well as to materially facilitate the re-weighing of matter of a supposedly known weight whereby it may be ascertained at a glance whether such matter is of that supposed weight, or is in excess of or less than the same.

It is likewise an equally important object of the invention to provide an attachment of the character mentioned which may be operatively attached or installed upon any type of balance beam scale, either gravity, spring, or other design, without alteration to the parts thereof and without, in any way interfering with the effectual usage thereof.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one embodiment of the same.

In these drawings:—

Figure 1:
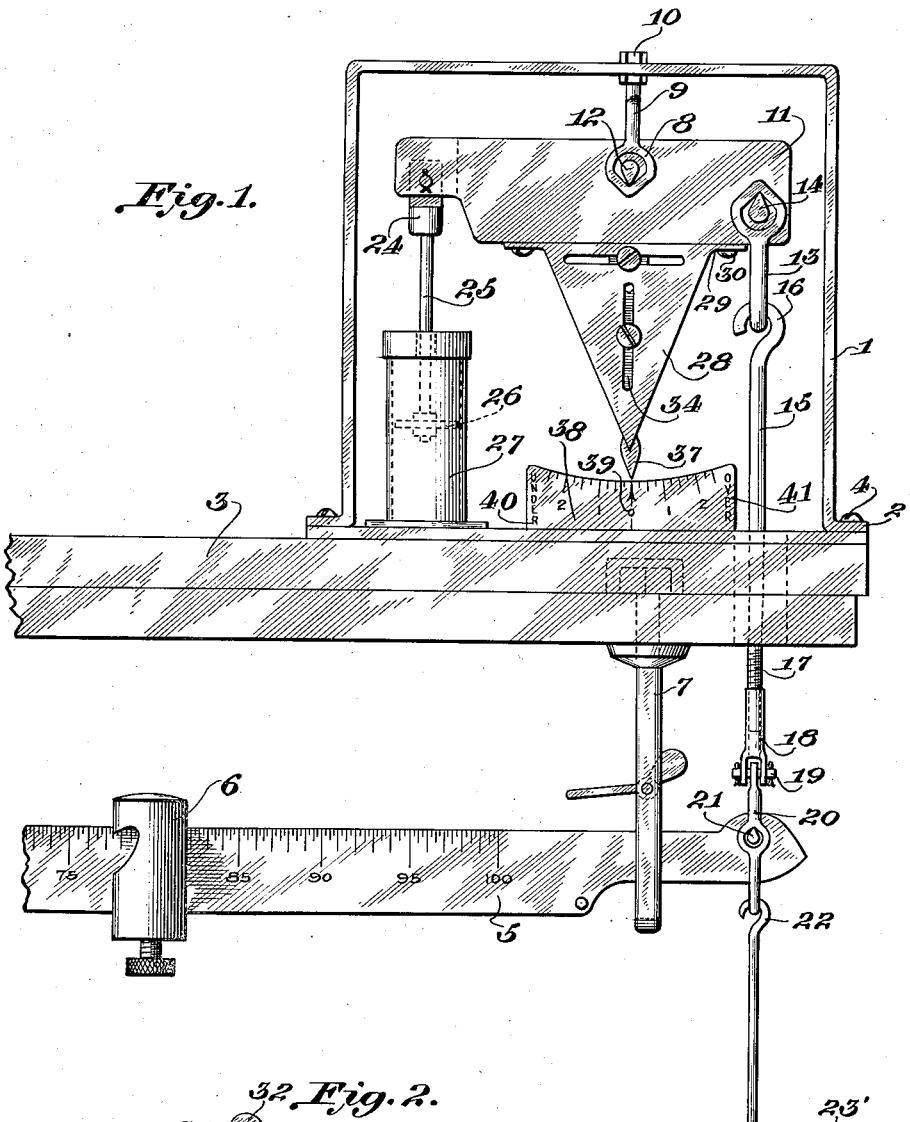
Figure 2:
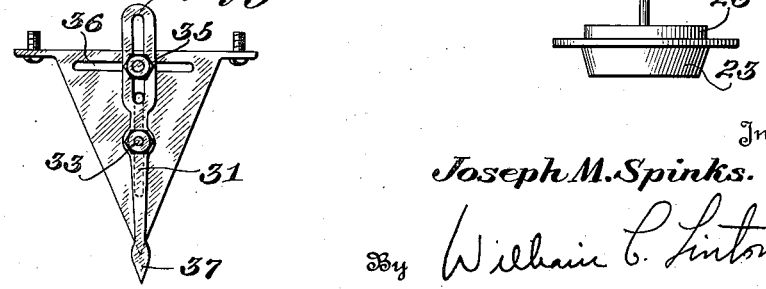

Figure 1 is a front elevation of the improved attachment operatively connected to the usual wooden cap of ordinary portable platform scales; and, Figure 2 is a detail in elevation of the reverse or opposite side of the indicator, as shown in the Figure 1.

Having more particular reference to the drawings, in connection with which like characters of reference will designate corresponding parts throughout, it may be stated that the invention generally has for its objective, to provide a practical, simple, and inexpensive attachment, without too numerous parts, which require extra service to maintain; covering the application of an over or under weight, light or heavy zero balance attachment to any beam scale. The attachment, to this end, covers a form of construction following the pendulum idea, thereby eliminating springs, cams, tapes and ribbons, all of which lend to intricacy and the impracticability of operation, such device as herein shown consisting of a substantially U-shaped, but inverted, metal supporting frame 1 having laterally off-set extremities 2 whereby to facilitate the fixed connection or securing of the same to the usual wooden cap 3 of ordinary portable platform scales through the medium of screws or similar fastening devices 4; the same, obviously, being positioned adjacent the free extremity of such cap, as is shown in the Figure 1. The equipped platform scales, which are of the balance beam type, include the usual balance beam 5, adjustable poise 6, and trig loop 7, through which the free and reduced end of the balance beam 5 is movably received, as indicated in the Figure 1.

Depending from the upper portion of the supporting bracket 1 is a fulcrum loop 8, the same being provided with a perpendicularly disposed shank portion 9, the upper extremity of which is screw threaded and is adapted to have lock nuts 10 turned into engagement with portions thereof, as shown, whereby to immovably connect the same to said frame. This fulcrum loop 8 serves to pivotally support the lever or arm 11, being of a forked or bifurcated construction, and adapted to receive fulcrum or pivot pins 12 therein, said pins 12 extending from the opposite sides of the lever 11 at a point intermediately of and off-center with respect thereto, as is shown in the accompanying drawings.

To that end of the lever 11 constituting the shorter portion of the same to the point of fulcrum or pivoting thereof in the fulcrum loop 8, another fulcrum loop or rather load loop 13 is pivotally connected through the medium of pivot or fulcrum pins 14 extending from the opposite sides of said adjacent end portions of the lever 11 through and into pivotal engagement with the loop. A connecting rod 15 is provided the lever, having the upper end thereof hooked, as indicated at 16, and releasably engaged with the body portion of the load loop 13, while the lower extremity thereof is screw threaded, as at 17, and is turned into engagement with a shackle piece 18 receiving a pivot or coupling pin 19 through its bifurcated extremity, which pin, in turn, is adapted to be normally connected to the adjacent end of a double loop coupling 20 pivotally mounted upon the reduced and free end of the balance beam 5 through the pivotal mounting generally indicated at 21; the lower end of such coupling serving to detachably receive the hooked end 22 of the balancing weight 23 therein.

From the foregoing, it will be understood that with connection of the balancing weight 23 to the shorter portion of the lever 11, said lever may be adjusted so as to accurately balance upon its pivotal mounting on the fulcrum loop 8 for pivotal movement and to stabilize this pivotal movement, that is, to render the same steady and free of vibratory motion, there is preferably pivotally connected to the opposite end of the lever 11, through the medium of a coupling 24, a dash rod 25 carrying a plunger head 26 working within a cylinder or barrel of a dash pot 27, normally filled with oil of proper consistency or viscosity.

With a view towards providing the attachment with effectual indicator means, I provide a substantially triangular indicator, herein designed by the numeral 28, securing the same to the intermediate and under side portion of the lever 11 through the medium of integral extensions 29, through which screws, bolts, or other fastening devices 30, are passed into engagement with said lever. A pointer arm 31 is provided this indicator, being adapted to be positioned vertically of the same, as is shown in Figure 2, having a longitudinally slotted upper end portion 32, while the intermediate portion thereof is formed with an opening adapted to receive one end of an adjusting bolt 33 therethrough, said bolt passing through a vertically disposed slot 34 formed in the indicator 28, whereupon a suitable locking nut is engaged with the bolt for obvious purposes. A similar locking or adjusting bolt 35 is slidably received through the elongated slotted upper portion 32 of the arm 31 and likewise, passes through a horizontally disposed slot 36 in the upper extremity or portion of the indicator 28. Because of this peculiar mounting of the indicator arm 31 with respect to the indicator 28, it will be understood that the indicator proper 37 may be adjusted to the desired nicety with respect to such indicator 28 merely by loosening the adjusting bolts 33 and 35, effecting the desired horizontal or vertical or compound movement of the arm 31 and then retightening said bolts 33 and 35 to secure the now adjusted arm 31 in proper position. It will be noted, in this connection, that the indicator 28 and the pointer arm 31 are made of one piece of metal and the bolt 33 is used to adjust accuracy of the pendulum, and bolt 35 is used to balance the lever 11 in level position.

Cooperating with the indicator proper 37 is a chart 38, the same being immovably mounted upon adjacent portion of the cap 3 as shown in the Figure 1 and of course, being equipped with suitable markings extending to either side of an intermediate or zero point 39. These markings to either side of the zero point 39 represent over and under or light and heavy weights, and to identify the same, the words "Over" and "Under", as indicated at 40 and 41 are preferably presented upon the face of such chart in some suitable manner.

The modus operandi of the invention is as follows:—

Bearing in mind that the lever 11 is constructed so that the part below the line of pivoting of the same is heavier than the part above the line of pivoting thereof thereby producing a pendulum effect and that the end to which the dash rod 25 is attached is heavier than that end to which the load loop with the attached loose weight 23 is heavier, the attachment is balanced at the zero marking 39 upon the chart 38 by first disconnecting the coupling pin 19 from the adjacent end of the double loop 20 whereupon the loose top weight 23 from the counterpoise weight and the hooked end 22 is connected to the shackle 18, following which proper adjustment of the indicator arm 31 upon the indicator 28 is effected and is then locked in its properly adjusted position through the medium of the adjusting bolts 33 and 35. The balance of scale beam 5 is now balanced at the center of the trig loop 7 and the attachment by placing the weight 23' upon the aforesaid counterpoise or weight 23, then reconnecting the coupling 19 to the adjacent end of the double loop 20 and turning the connecting rod 15 in the shackle 18 until the indicator proper 37 is aligned with the zero markings 39. The scale is now ready to weigh and assuming that the same is to be or is being used to verify or adjust the weight of certain matter supposed to amount to 100 pounds, the poise 6 of the balance 5 is set thereon to 100 pounds and the matter to be weighed is placed on the scale platform. Should such matter weigh exactly 100 pounds, the indicator proper 37 will accurately align with the zero markings 39. If, however, the matter should weigh 98 pounds, the indicator proper 37 will then align with the numeral 2 of those markings to the left of the zero marking 39 indicated "Under" weight in amount of 2 pounds. Should it be desired to make up the additional weight to the required 100 pounds, the user may readily increase the weight of the matter until the indicator proper 37 exactly coincides with the zero markings 39, thus indicating that the proper weight has been attained. The same procedure or operation occurs in event that the weight is in excess of 100 pounds and is placed upon the platform of the scales, except that the indicator proper 37 would then move to the right of the zero markings 39 along the chart 38 to those numbers or markings on the "Over" side of said chart. To secure the desired weight, matter is removed from the bulk arranged upon the platform until the indicator proper 37 aligns with the zero markings 39.

From the foregoing, it will be understood that I have provided an attachment which will be especially useful in the weighing and accurate checking of various matter placed upon the platform of an equipped scale, in that a user may quickly and readily ascertain whether or not such matter is over or under weight without moving the poise 6 on the balance beam 5, and then make the necessary adjustment of such matter being weighed, so as to quickly bring the same to the desired or prescribed weight, seeing the progress of the adjustment of weight of such matter all the while. Also, the attachment when used for ordinary weighing, will enable a user to secure an accurate zero balance much quicker than he would be able to obtain with adjustment or manipulation of the balance beam alone.

Manifestly, the construction shown is capable of considerable modification, and such modification as is within the scope of my claims, I consider within the spirit of my invention.

I claim:—

1. A device of the character described comprising in combination with scales of the balance beam type, a supporting frame immovably mounted on the scales, a lever mounted off-center on said frame, a connecting rod connected at one end to the balance beam and pivotally connected at its other end to one end of the lever, an indicator carried by the lever, a chart immovably positioned with respect to the indicator, and motion stabilizing means connected to the opposite end of the lever.

2. A device of the character described comprising in combination with scales of the balance beam type, a supporting frame immovably mounted on the scales, a lever mounted to have the major portion of its weight disposed below upon said frame, a connecting rod connected at one end to the balance beam and pivotally connected at its other end to one end of the lever, an indicator carried by the lever, a chart immovably positioned with respect to the indicator, and motion stabilizing means connected to the opposite end of the lever.

3. A device of the character described comprising in combination with scales of the balance beam type, a supporting frame immovably mounted upon the scales, a lever mounted on said frame in a manner to have the major portion of the weight dependent therefrom, a connecting rod adjustably and removably connected at one end to the balance beam and pivotally connected at its opposite end to one end of the lever, an indicator carried by the lever, a chart immovably positioned with respect to the indicator, and motion stabilizing means connected to the opposite portions of the lever.

4. A device of the character described comprising in combination with scales of the balance beam type, a supporting frame immovably mounted on the scales, a lever mounted on the upper portion of said frame in a manner to have the major portion of its weight dependent from its mounting, a connecting rod adjustably and removably connected at one end to the balance beam and pivotally connected at its remaining end to one end of the lever an indicator carried by the lever, a chart immovably positioned with respect to the indicator, and means connected to the opposite end of the lever for preventing vibration thereof during pivotal movement.

5. A device of the character described comprising in combination with scales of the balance beam type, a supporting frame immovably mounted on the scales, a lever mounted off-center on said frame, a connecting rod adjustably and removably connected at one end to the balance beam and pivotally connected at its other end to one end of the lever, an indicator carried by the lever, a chart immovably positioned with respect to the indicator, and means connected to the remaining end of said lever for preventing vibration thereof during its pivotal movement.

6. A device of the character described comprising in combination with scales of the balance beam type, a supporting frame mounted on the scales, a lever mounted on said frame in a manner to have the major portion of the weight thereof dependent from its pivotal mounting, a connecting rod adjustably connected at one end to the balance beam and pivotally connected at its other end to one end of the lever, an indicator carried by the lever, an indicator arm mounted for compound adjustment on said indicator, a chart immovably positioned with respect to the indicator, and motion stabilizing means connected to the opposite end of the lever.

7. A device of the character described comprising in combination with scales of the balance beam type, a supporting frame mounted on the scales, a lever mounted off-center on said frame in a manner to have the major portion of the weight thereof dependent from its point of pivotal mounting, a connecting rod adjustably and removably connected at one end to the balance beam and pivotally connected at its other end to one end of the lever, an indicator carried upon the under side of the lever, an indicator arm mounted for compound adjustment on said indicator, a chart immovably positioned with respect to the indicator, and motion stabilizing means connected to the opposite end of the lever.

8. A device of the character described comprising in combination with scales of the balance beam type, a supporting frame mounted on the scales, a lever mounted off-center on said frame in a manner to have the major portion of the weight thereof dependent from its pivotal mounting, a connecting rod adjustably and removably connected at one end to the balance beam and pivotally connected at its other end to one end of the lever, an indicator carried on the lever, an indicator arm mounted for compound adjustment on said indicator, a chart immovably positioned with respect to the indicator, a dash pot immovably positioned upon said frame, and a plunger movably received in said dash pot and pivotally connected to the remaining end of said lever.

In witness whereof I have hereunto set my hand.

JOSEPH M. SPINKS.